US006634511B2

(12) United States Patent  (10) Patent No.: US 6,634,511 B2
Manghera  (45) Date of Patent: Oct. 21, 2003

(54) MODULAR SHELVING SYSTEM AND COMPONENTS

(76) Inventor: Mark J. Manghera, 4713 School Rd., Madison, WI (US) 53704

( * ) Notice: Subject to any disclaimer, the term of this patent is extended or adjusted under 35 U.S.C. 154(b) by 0 days.

(21) Appl. No.: 10/027,026

(22) Filed: Dec. 20, 2001

(65) Prior Publication Data

US 2003/0116517 A1 Jun. 26, 2003

(51) Int. Cl.[7] .......................... A47B 57/48; F16B 13/00
(52) U.S. Cl. ...................... 211/187; 108/180; 403/294
(58) Field of Search .......................... 211/187; 403/292, 403/388, 294; 446/122, 124, 128; 312/257.1, 263, 265.5, 265.6; 108/180, 193

(56) References Cited

U.S. PATENT DOCUMENTS 2,319,415 A * 5/1943 Lightfoot ................. 312/257.1
3,378,320 A * 4/1968 Morgan et al. ........... 312/257.1
3,415,554 A * 12/1968 Papayoti ..................... 403/388
3,604,146 A * 9/1971 Winer ........................ 446/122
4,030,236 A * 6/1977 Schnabel .................... 446/128
4,055,373 A * 10/1977 Andresen et al. ........... 312/263

* cited by examiner

Primary Examiner—Daniel P. Stodola
Assistant Examiner—Erica B Harris

(57) ABSTRACT

A modular shelving system includes structural shelving components and connector shelving components for joining the structural shelving components together in a variety of configurations. Each structural shelving component has a face surface and elongated edge surfaces. A plurality of apertures are formed extending along the edge surfaces of the structural shelving component. A center-to-center distance between adjacent apertures is X. A distance between the centers of the apertures and the face surface is X/2. A distance between an end one of the apertures and an end of the edge surface is X/2. Each connector shelving component has a plurality of projections extending therefrom. A center-to-center distance between adjacent projections is X.

14 Claims, 4 Drawing Sheets

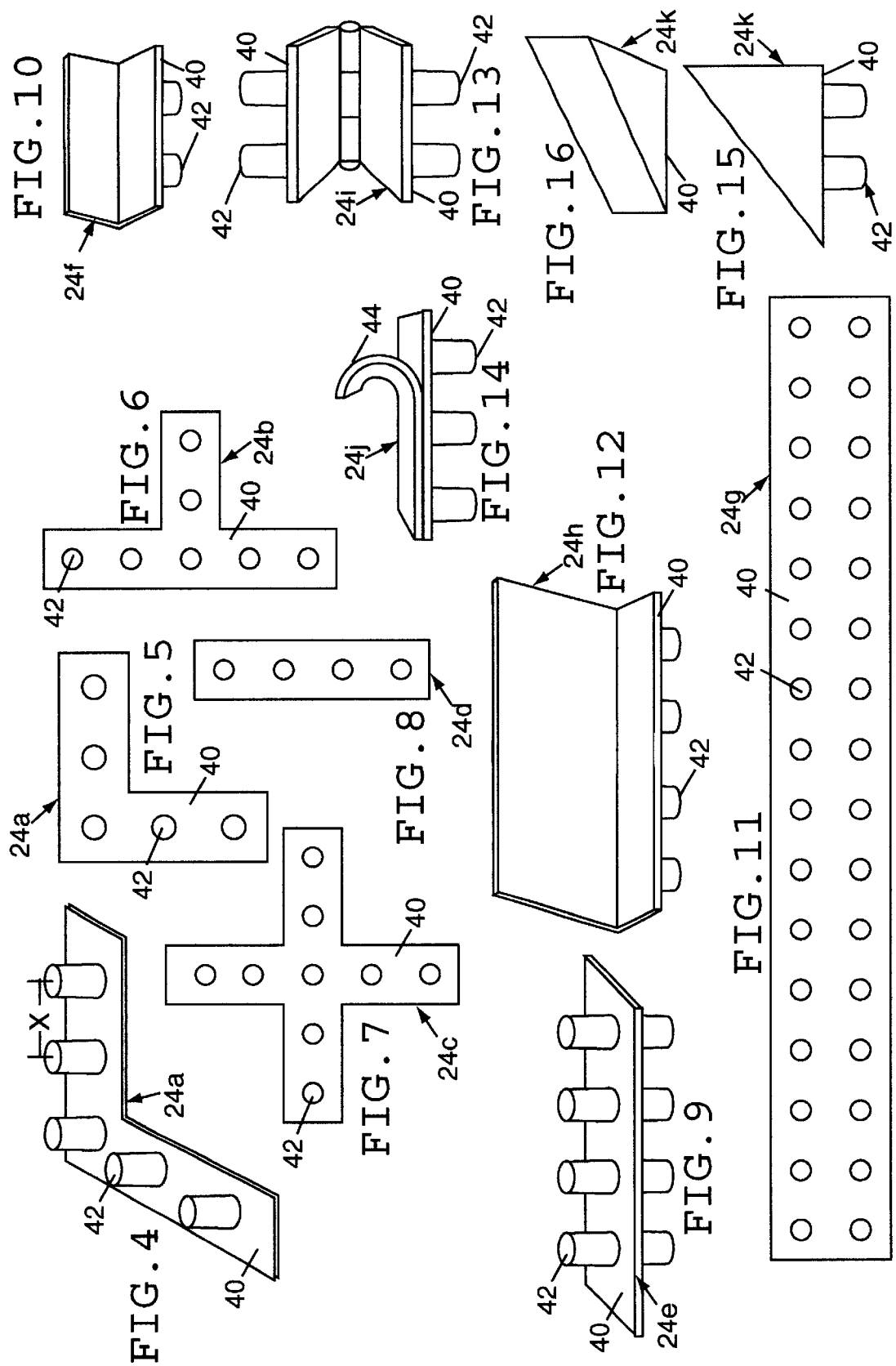

MODULAR SHELVING SYSTEM AND COMPONENTS

FIELD OF THE INVENTION

This invention pertains generally to furniture, and more particularly to shelving such as modular shelving having shelving pieces which may be combined to form a variety of shelving configurations.

BACKGROUND OF THE INVENTION

Many types of shelving are available which span the range in cost, appearance, and portability. Built-in shelving systems made of wood and similar materials are often very attractive. However, such systems can be expensive to install, often requiring customized construction for the room in which the shelves are to be placed. Also, once constructed, built-in shelving systems become a permanent feature of the room in which they are placed. Such shelving systems are not portable. Stand alone shelving pieces, such a stand alone book cases, made of wood and similar materials can also be attractive. While such shelving pieces can be moved, as a practical matter, they are often relatively large pieces of furniture which can be very heavy, unwieldy, and difficult to transport easily. At the other end of the scale from built-in shelving and stand alone shelving pieces are shelving systems which are designed to be portable. Such systems span the range from the impromptu board, cinder block, and milk crate shelving which are staples of many college dorm rooms, to much more sophisticated shelving systems made of wood or metal which can be disassembled or even folded about hinges for easy transport.

Most portable shelving systems, and even some built-in shelving systems, allow for adjustment of the number of shelves and the spacing between shelves in the system. This feature is provided by extending tabs or other structures formed extending from the vertical support structure of the shelving system and upon which individual shelves may be placed. These extending shelf support tabs or other structures are often removeably positioned in holes or slots formed in the face sides of vertical support structures. In other systems shelves may be removably held in position on vertical support structures using fasteners, such as screws or bolts. Such fasteners are most typically used to hold together metal shelving systems which may be disassembled for transport.

Beyond the ability to move the positions of shelves in the system, a limitation of most existing shelving systems is that they are often very inflexible with regard to the shelving arrangements which otherwise can be established using such systems. Unless one is willing to pay the price of having custom shelving made for a specific space or specific desired configuration, one is typically limited to selecting from a limited number of shelving arrangements which, in general, cannot be easily configured to an individual space or desired configuration.

What is desired, therefore, is a shelving system in which the component parts of the system are easily interchangeable such that an unlimited variety of shelving configurations can be formed quickly and easily. Such a modular shelving system should be able to be implemented inexpensively, and should be easily assembled, disassembled, and reassembled in a variety of configurations by anyone without requiring carpentry skills of any kind.

SUMMARY OF THE INVENTION

The present invention provides a modular shelving system including component parts which are easily assembled together to form a variety of shelving configurations. A modular shelving system in accordance with the present invention includes basic shelving components of two types, structural shelving components and connector shelving components. Structural shelving components in accordance with the present invention may be employed as both horizontally oriented shelves and vertically oriented shelf support structures in a modular shelving system in accordance with the present invention. The structural shelving components are formed such that they may be joined together easily using the connector shelving components to form a variety of shelving configurations.

Structural shelving components in accordance with the present invention are preferably formed in the shape of substantially flat boards having parallel face surfaces separated by edge surfaces preferably formed at right angles thereto. The structural shelving components may be formed in a variety of sizes and may be formed of a variety of structural materials, e.g., plastic, metal, reinforced wood, etc., using a variety of fabrication processes. A plurality of preferably circular apertures are formed along at least two opposite parallel edge surfaces of each structural shelving component. Each of the plurality of apertures are separated from each other along the length of the edge surfaces such that the center-to-center distance between the apertures is a first distance X. Each of the plurality of apertures are also positioned along the length of the edge surfaces such that the distance between the center of each aperture and a face surface adjacent to the edge surfaces on which the apertures are formed is X/2. Furthermore, preferably at least one of the plurality of apertures is positioned on the edge surface such that the distance between the center of this at least one aperture and a second edge surface adjacent and perpendicular to the edge surface on which the aperture is formed is also X/2.

Connector shelving components in accordance with the present invention may be formed as substantially flat plates having a plurality of projections extending from a substantially flat surface thereof. The connector shelving components may be formed in a variety of shapes from a variety of structural materials, such as metal or plastic, using a variety of manufacturing processes. In accordance with the present invention, the plurality of projections extending from the connector shelving components are sized and shaped to fit snugly in the apertures formed along the edge surfaces of the structural shelving components, and are separated from each other on the connector shelving components such that a center-to-center distance between the projections is the distance X.

In accordance with the present invention, structural shelving components are joined together using the connector shelving components to form modular shelving of any desired configuration. Such shelving is formed by selecting structural shelving components of a desired size and shape, placing the structural shelving components adjacent to each other (face-to-face, edge-to-edge, or edge-to-face) to form the desired shelving configuration, and then joining the structural shelving components together by inserting the projections extending from a connector shelving component of the desired shape into the apertures formed in the edge surfaces of the adjacently positioned structural shelving components. The respective spacing and positioning of the apertures on the edge surfaces of the structural shelving components and the projections extending from the connector shelving component allow the structural shelving components to be joined together to form a variety of shelving configurations. Structural shelving components and connector shelving components of various sizes and shapes in accordance with the present invention may be made available as individual components, or provided as a kit including a plurality of structural shelving components and connector shelving components in accordance with the present invention.

Further objects, features, and advantages of the invention will be apparent from the following detailed description taken in conjunction with the accompanying drawings.

BRIEF DESCRIPTION OF THE DRAWINGS

FIG. 4 is a perspective view of an exemplary connector shelving component in accordance with the present invention for joining a vertical structural shelving component to a horizontal structural shelving component in accordance with the present invention.

FIG. 5 is a plan view of the exemplary connector shelving component of FIG. 4.

FIG. 6 is a plan view of another exemplary connector shelving component in accordance with the present invention for joining one or more vertical structural shelving components to one or more horizontal structural shelving components in accordance with the present invention.

FIG. 7 is a plan view of yet another exemplary connector shelving component in accordance with the present invention for joining together three or four structural shelving components in accordance with the present invention.

FIG. 8 is a plan view of an exemplary connector shelving component in accordance with the present invention for joining together two structural shelving components in accordance with the present invention positioned edge-to-edge by positioning the connector along adjacent edge surfaces of the structural shelving components to be joined together.

FIG. 9 is a perspective view of an exemplary connector shelving component in accordance with the present invention for joining together two structural shelving components in accordance with the present invention by positioning the connector between edge surfaces of the structural shelving components to be joined together.

FIG. 10 is a perspective view of another exemplary connector shelving component in accordance with the present invention.

FIG. 11 is a plan view of an exemplary connector shelving component in accordance with the present invention for joining together structural shelving components in accordance with the present invention.

FIG. 12 is a perspective view of yet another exemplary connector shelving component in accordance with the present invention.

FIG. 13 is a perspective view of an exemplary connector shelving component in accordance with the present invention for joining together two structural shelving components together in a hinged relationship.

FIG. 14 is a perspective view of an exemplary connector shelving component in accordance with the present invention for implementing a hook for hanging items from a structural shelving component in accordance with the present invention.

FIG. 15 is a side view of an exemplary connector shelving component in accordance with the present invention for implementing a stabilizing foot for a modular shelving system in accordance with the present invention.

FIG. 16 is a perspective view of the connector shelving component illustrated in FIG. 15.

DETAILED DESCRIPTION OF THE INVENTION

Figure 1:
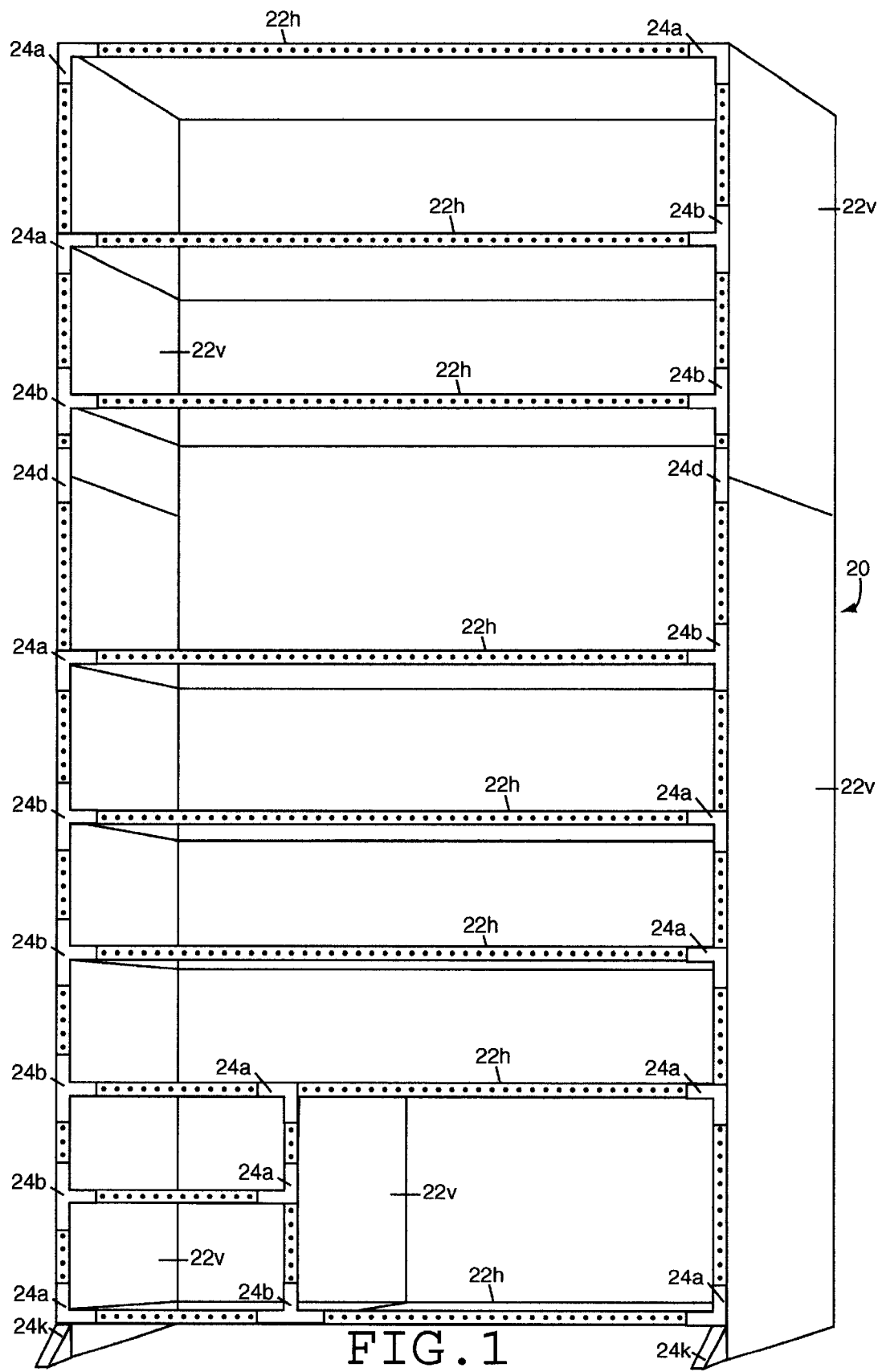
FIG. 1 is a perspective view of an exemplary modular shelving system in accordance with the present invention, formed of a plurality of structural shelving components and connector shelving components in accordance with the present invention.
Figure 2:
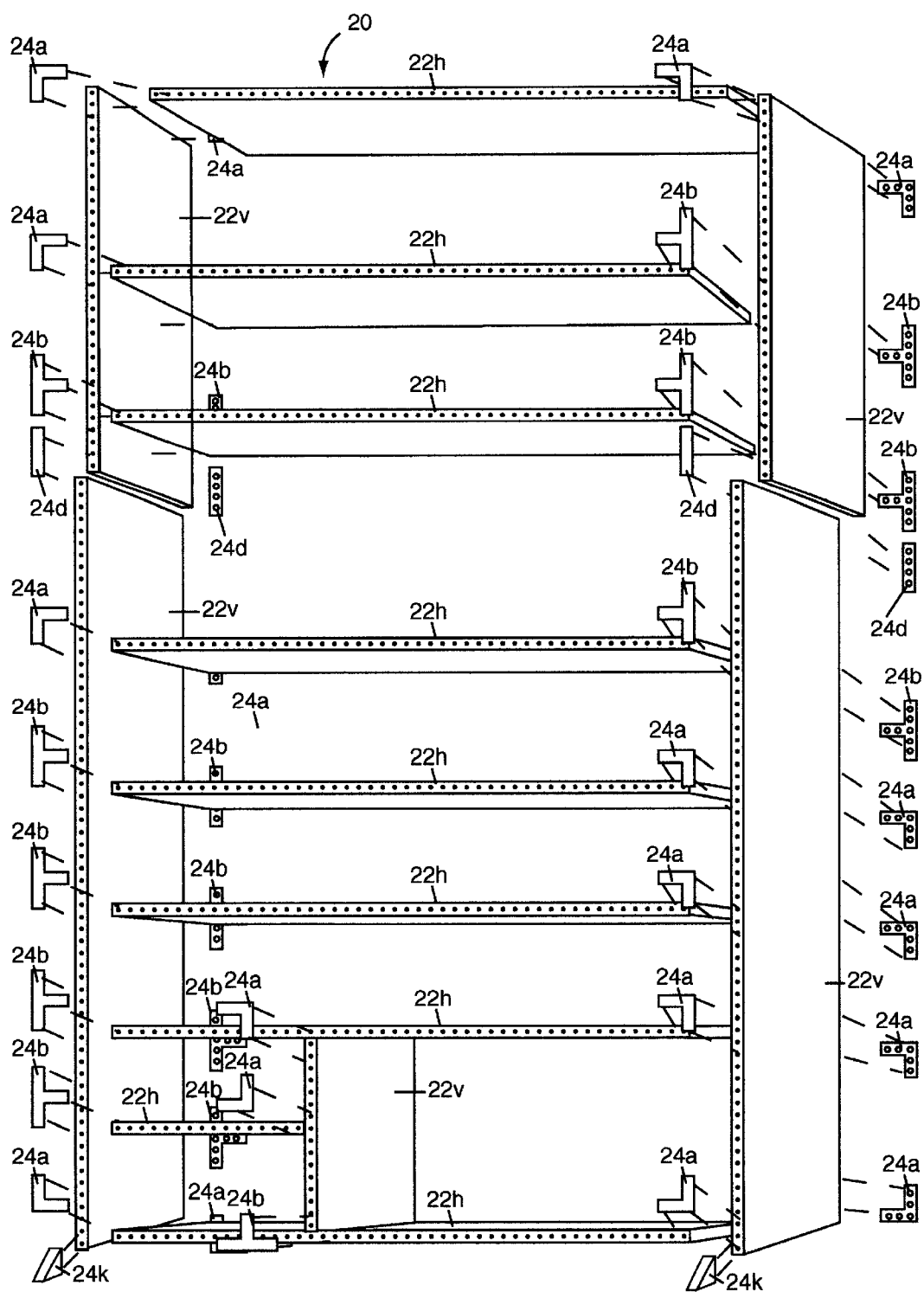
FIG. 2 is an exploded perspective view of the exemplary modular shelving system of FIG. 1.

An exemplary modular shelving system 20 in accordance with the present invention is illustrated in FIGS. 1 and 2. It should be understood that a modular shelving system in accordance with the present invention may be formed in almost any desired size and configuration. Thus, the exemplary modular shelving system 20 is but one of an infinite number of different shelving configurations which may be made in accordance with the present invention.

A modular shelving system 20 in accordance with the present invention is formed of shelving components of two basic types, structural shelving components 22 and connector shelving components 24. In accordance with the present invention, the connector shelving components 24 are employed to connect together the structural shelving components 22 into a modular shelving system of any desired configuration. In accordance with the present invention, structural shelving components 22 may be employed interchangeably for vertical shelving support structures 22$v$, for supporting shelves and dividing shelf space vertically, and for horizontally oriented shelves 22$h$.

Figure 3:
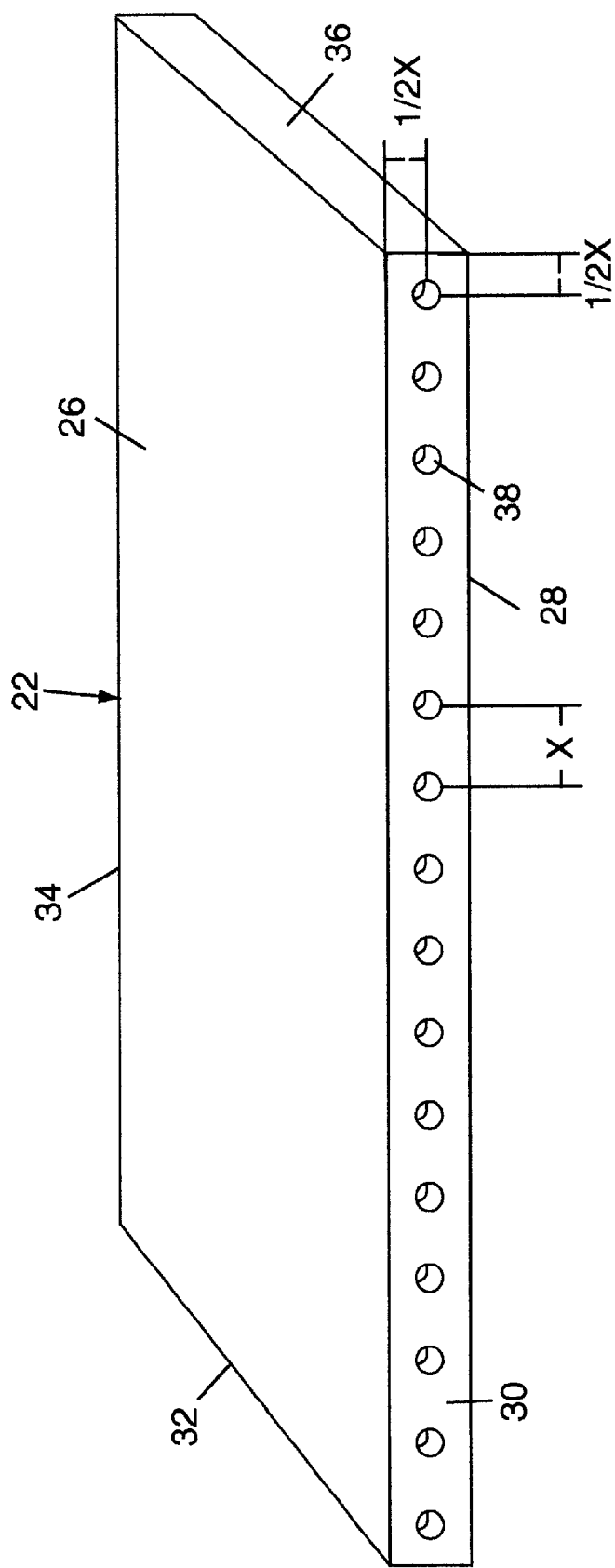
FIG. 3 is a perspective view of an exemplary structural shelving component in accordance with the present invention.

An exemplary structural shelving component 22 in accordance with the present invention will be described in detail with reference to FIG. 3. A structural shelving component in accordance with the present invention preferably has the shape of a generally flat board having two substantially flat parallel face surfaces 26 and 28, with generally elongated edge surfaces 30, 32, 34, and 36 formed therebetween, with the face 26, 28, and edge 30, 32, 34, and 36 surfaces formed at right angles to each other to form the shape of the structural shelving component 22. A structural shelving component in accordance with the present invention may have a different size and shape from the exemplary structural shelving component illustrated in FIG. 3.

A plurality of apertures 38 is formed extending along the length of at least two preferably opposite parallel edge surfaces 30, 34 of the structural shelving component. The plurality of apertures may also be formed along more than two or other edge surfaces of the structural shelving component. The plurality of apertures 38 may extend entirely along the edge surfaces 30, 34 of the structural shelving component 22, as illustrated in FIG. 3, or may extend along only a portion of the edge surfaces 30, 34 of the structural shelving component 22. Each of the plurality of apertures 38 formed along the edge surfaces 30,34 of the structural shelving component may preferably be round in shape, although other shapes may also be used. The structural shelving component 22 may be formed of any appropriate material, such as, for example, plastic or metal, in a conventional manner. Similarly, the apertures 38 may be formed in the edge surfaces 30, 34 of the structural shelving component 22 in any conventional manner, such as, for example, by molding the apertures 38 into the edge surfaces 30, 34 of a molded plastic structural shelving component 22 during the fabrication thereof. A structural shelving component in accordance with the present invention may also be made of a combination of materials to form a structural shelving component having the desired aesthetic and structural characteristics. For example, the structural shelving component may be formed of wood with metal reinforced edges, to provide strength to the wood structural shelving component along the edges thereof in which the apertures 38 are formed.

The plurality of apertures 38 is formed along the edge surfaces 30,34 of the structural shelving component 22 such that the center-to-center spacing between at least two adjacent apertures is a selected distance X. Furthermore, the plurality of apertures 38 are formed along the edge surfaces 30, 34 of the structural shelving component 22 such that the distance from the centers of a plurality of the apertures to the edge of at least one, and, preferably, both, face surfaces 26, 28 of the structural shelving component 22 is X/2. Preferably, one of the plurality of apertures 38 positioned at the end of the edge surface 30, 34 of the structural shelving component 22 is positioned such that the distance between the center of the aperture 38 and the end of the edge surface 30 adjacent another (perpendicular) edge surface 32, 36 is also X/2. (For exemplary purposes only, for a structural shelving component 22 which is ¾ inches thick, a plurality of circular apertures 38 may be formed running centered along opposite parallel edge surfaces 30,34 of the component 22 (as illustrated in FIG. 3) with the diameter of the circular apertures 38 being, for example, ¼ inch, and with X ¾ inch.) This positioning of the apertures 38 formed in the edges 30,34 of the structural shelving component 22 in accordance with the present invention allows such structural shelving components 22 (e.g., of various sizes) to be joined together in various configurations, using connector shelving components 24 in accordance with the present invention, to form the vertical support structures and shelves of a modular shelving system in accordance with the present invention, as will be described in more detail below.

Connector shelving components 24 in accordance with the present invention are mounted in the apertures 38 formed in the edge surfaces 30, 34 of structural shelving components 22, e.g., to join such structural shelving components together to form a modular shelving system of a desired configuration. Connector shelving components 24 in accordance with the present invention may have a variety of sizes and shapes, so as to be useable, for example, to join together structural shelving components in accordance with the present invention in a variety of configurations. Exemplary connector shelving components 24 in accordance with the present invention, having a variety of shapes, sizes, and corresponding purposes, are illustrated in FIGS. 4–16. It should be understood that connector shelving components 24 in accordance with the present invention may have different and additional sizes and shapes from those illustrated herein.

A connector shelving component 24 in accordance with the present invention includes a substantially flat surface 40 from which extend a plurality of projections 42. The projections 42 are sized and shaped to correspond to the apertures 38 formed in the edges 30, 34 of structural shelving components 22 in accordance with the present invention. (Preferably the projections 42 are sized and shaped to provide a snug but removeable fit when inserted into corresponding apertures 38 formed in a structural shelving component 22. For example, the projections may be formed with tapering sides such that the projections are slightly smaller in circumference than the apertures 38 formed in the structural shelving component 22 near the distal ends of the projections 42, to facilitate insertion of the projections 42 into the apertures 38, and slightly larger in circumference than the apertures 38 near the proximal base end thereof, near the substantially flat surface 40, to form a snug fit when fully inserted into the apertures 38.) The projections 42 are positioned along the flat surface 40 of the connector shelving component 24 such that the center-to-center distance between each of a plurality of such projections is the distance X (the same as the center-to-center distance between apertures 38 formed in the structural shelving components). The projections 42 may be arranged extending from the flat surface 40 of the connector shelving component 24 in a pattern (which may depend on the shape of the connector shelving component) for joining together two or more structural shelving components 22 in accordance with the present invention which are positioned adjacent to each other in a desired configuration. Application of several of the connector shelving components 24 illustrated for joining together structural shelving components 22 in accordance with the present invention to form the modular shelving system 20 is illustrated in FIGS. 1 and 2. Connector shelving components 24 in accordance with the present invention may be formed of any appropriate material of the desired strength and rigidity using any conventional manufacturing process therefore. For example, connector shelving components in accordance with the present invention may be molded of plastic or, preferably, of metal, in the desired size and shape.

Connector shelving components 24 in accordance with the present invention may be sized and shaped not only to join together two or more structural shelving components 22 in accordance with the present invention, but also or alternatively for attaching other structures to such structural shelving components. For example, a connector shelving component 24J (FIG. 14) in accordance with the present invention may be mounted in the apertures 38 formed in the edge 30 of a structural shelving component 22 used in a modular shelving system to provide a hook 44 for hanging items from the system. A connector shelving component 24K (FIGS. 15 and 16) in accordance with the present invention may be mounted in the apertures 38 formed in the bottom of the edge of a structural shelving component 22 in accordance with the present invention used to provide a vertical support structure for a modular shelving system, to form an extending foot to provide support for the system (see, e.g., FIG. 2).

Structural 22 and connector 24 shelving components in accordance with the present invention may be provided as individual items of various shapes and sizes, or in a kit. A kit of structural 22 and connector 24 shelving components in accordance with the present invention includes a plurality of structural 22 and connector 24 shelving components in accordance with the present invention which may be joined together to form modular shelving systems having a variety of configurations. Preferably a variety of differently sized and shaped structural 22 and connector 24 shelving components may be included in each kit.

A modular shelving system in accordance with the present invention is easily assembled in a desired configuration by first selecting structural shelving components 22 of the desired size and shape to form the horizontal and vertical structural components of the shelving system to be constructed. The structural shelving components 22 are then placed adjacent to each other (e.g., edge-to-edge, edge-to-face, face-to-face) to form the desired configuration and then joined together using the appropriately sized and shaped connector component 24 by placing the projections 42 extending from the connector component 24 into the corresponding apertures 38 formed in the adjacently positioned structural components 22 to be joined together. (A mallet or other tool may be used to tap the connector component 24 securely into position.) The spacing of the apertures 38 formed in the structural shelving components 22 allows the structural shelving components 22 to be employed interchangeably as vertical shelf support structures or as horizontal shelves. Additional connector components may be mounted in the apertures 38 formed in the structural shelving components 22 to add additional structures to the modular shelving system thus formed, as described above. A modular shelving system in accordance with the present invention thus formed may be disassembled for transportation or reconfiguration by simply removing the connector components 24 from the structural shelving components 22. (A tool may be required to remove the connector components 24 from the structural shelving components 22.)

It should be understood that the present invention is not limited to the particular exemplary applications and embodiments thereof as illustrated and described herein, but embraces such modified forms thereof as come within the scope of the following claims.

What is claimed is:

1. A modular shelving system, comprising:
   (a) a plurality of vertically oriented shelving support structures, wherein each of the plurality of vertically oriented shelving support structures includes two substantially flat parallel face surfaces with generally elongated edge surfaces formed between the face surfaces, wherein the face and edge surfaces are formed at right angles to each other, and including a plurality of apertures formed in at least two of the edge surfaces and extending along a length thereof, wherein a center-to-center distance between the plurality of apertures is a selected distance X and wherein a distance between the center of each of the plurality of apertures and at least one of the face surfaces is X/2;
   (b) a plurality of horizontally oriented shelves, wherein each of the plurality of horizontally oriented shelves includes two substantially flat parallel face surfaces with generally elongated edge surfaces formed between the face surfaces, wherein the face and edge surfaces are formed at right angles to each other, and including a plurality of apertures formed in at least two of the edge surfaces and extending along a length thereof, wherein a center-to-center distance between the plurality of apertures is a selected distance X and wherein a distance between the center of each of the plurality of apertures and at least one of the face surfaces is X/2; and
   (c) a plurality of connector shelving components joining the vertically oriented shelving support structures to the horizontally oriented shelves to form a modular shelving system, wherein each connector shelving component includes a flat surface and a plurality of projections integral with and extending from the flat surface, wherein a center to center distance between adjacent ones of the plurality of projections is the distance X, and wherein each of the plurality of projections is inserted into a corresponding aperture formed in the vertically oriented shelving support structures or the horizontally oriented shelves to join the vertically oriented shelving support structures and the horizontally oriented shelves together.

2. The modular shelving system of claim 1 wherein the edge surfaces of the vertically oriented shelving support structures and the horizontally oriented shelves have ends and wherein a center of one of the plurality of apertures is positioned a distance of X/2 from the end of the edge surface.

3. The modular shelving system of claim 1 wherein the at least two edge surfaces of the vertically oriented shelving support structures and of the horizontally oriented shelves having apertures formed therein are parallel to each other.

4. The modular shelving system of claim 1 wherein the plurality of apertures formed in the vertically oriented shelving support structures and in the horizontally oriented shelves are circular and wherein the projections extending from the plurality of connector shelving components are circular.

5. The modular shelving system of claim 1 wherein the centers of the apertures formed in the vertically oriented shelving support structures and in the horizontally oriented shelves are a selected distance X/2 from both of the face surfaces of the vertically oriented shelving support structures and the horizontally oriented shelves.

6. The modular shelving system of claim 1 wherein the vertically oriented shelving support structures and the horizontally oriented shelves are interchangeable.

7. The modular shelving system of claim 1 wherein the plurality of projections formed extending from the connector shelving components are tapered.

8. A modular shelving system kit, comprising:
   (a) a plurality of shelving support structures, wherein each of the plurality of shelving support structures includes two substantially flat parallel face surfaces with generally elongated edge surfaces formed between the face surfaces, wherein the face and edge surfaces are formed at right angles to each other, and including a plurality of apertures formed in at least two of the edge surfaces and extending along a length thereof, wherein a center-to-center distance between the plurality of apertures is a selected distance X and wherein a distance between the center of each of the plurality of apertures and at least one of the face surfaces is X!2;
   (b) a plurality of shelves, wherein each of the plurality of shelves includes two substantially flat parallel face surfaces with generally elongated edge surfaces formed between the face surfaces, wherein the face and edge surfaces are formed at right angles to each other, and including a plurality of apertures formed in at least two of the edge surfaces and extending along a length thereof, wherein a center-to-center distance between the plurality of apertures is a selected distance X and wherein a distance between the center of each of the plurality of apertures and at least one of the face surfaces is X/2; and
   (c) a plurality of connector shelving components for joining the shelving support structures to the shelves to form a modular shelving system, wherein each connector shelving component includes a flat surface and a plurality of projections integral with and extending from the flat surface, wherein a center to center distance between adjacent ones of the plurality of projections is the distance X, and wherein each of the plurality of projections is adapted to be inserted into a corresponding aperture formed in the shelving support structures or the shelves to join the shelving support structures and the shelves together.

9. The modular shelving system kit of claim 8 wherein the edge surfaces of the shelving support structures and the shelves have ends and wherein a center of one of the plurality of apertures is positioned a distance of X/2 from the end of the edge surface.

10. The modular shelving system kit of claim 8 wherein the at least two edge surfaces of the shelving support structures and of the shelves having apertures formed therein are parallel to each other.

11. The modular shelving system kit of claim 8 wherein the plurality of apertures formed in the shelving support structures and in the shelves are circular and wherein the projections extending from the plurality of connector shelving components are circular.

12. The modular shelving system kit of claim 8 wherein the centers of the apertures formed in the shelving support structures and in the shelves are a selected distance X/2 from both of the face surfaces of the shelving support structures and the shelves.

13. The modular shelving system kit of claim 8 wherein the shelving support structures and the shelves are interchangeable.

14. The modular shelving system kit of claim 7 the plurality of projections formed extending from the connector shelving components are tapered.

* * * * *